United States Patent [19]

Inoue

[11] 4,379,236
[45] Apr. 5, 1983

[54] WINDMILL GENERATOR APPARATUS

[75] Inventor: Minoru Inoue, Tokyo, Japan

[73] Assignee: Meisei University, Tokyo, Japan

[21] Appl. No.: 257,203

[22] Filed: Apr. 24, 1981

[51] Int. Cl.$^3$ .............................................. F03D 1/04
[52] U.S. Cl. ...................................... 290/55; 290/44
[58] Field of Search .................... 290/44, 55; 415/2–4; 416/9, 13

[56] References Cited

U.S. PATENT DOCUMENTS

| | | | |
|---|---|---|---|
| 3,883,750 | 5/1975 | Uzzell, Jr. | 290/44 X |
| 4,047,834 | 9/1977 | Magoveny et al. | 290/55 X |
| 4,079,264 | 3/1978 | Cohen | 290/55 |
| 4,132,499 | 1/1979 | Igra | 290/55 X |
| 4,162,410 | 7/1979 | Amick | 290/55 |
| 4,164,382 | 8/1979 | Mysels | 290/55 X |

Primary Examiner—J. V. Truhe
Assistant Examiner—W. E. Duncanson, Jr.
Attorney, Agent, or Firm—Birch, Stewart, Kolasch & Birch

[57] ABSTRACT

A duct possessing structure includes an annular first floor and an annular first roof disposed substantially horizontally, vertical stationary guiding partitions provided radially between the first floor and roof, and a centrally located hollow cylindrical space. A revolving body includes a circular second floor and a circular second roof, and a pair of guide pillar members disposed between the second floor and roof. Each guide pillar member comprises a duct-blocking arcuate outer wall along the outer circumference of the second floor and roof, and a duct-forming curved inner wall connecting both side edges of the arcuate outer wall. The revolving body is disposed within the hollow cylindrical space of the duct possessing structure and is adapted for rotation about an axis coaxial with that of the center axis of the cylindrical space. A windmill is supported for rotation within a hollow space, defined by the floor, roof and the pair of guide pillar members of the revolving body, and about a vertical axis which is the central axis of the hollow space. A generator is connected for rotation with the horizontal rotary shaft of the windmill, and wind directional means is provided for turning the revolving body to point the windmill in the windward direction.

6 Claims, 11 Drawing Figures

WINDMILL GENERATOR APPARATUS

BACKGROUND OF THE INVENTION

This invention relates to a windmill generator apparatus.

Various types of windmill generator apparatus exist in the art, but the great majority of them have the windmill mounted at the top of a large steel tower or the like. With a windmill generator apparatus of this type, therefore, considerable difficulties are encountered in devising countermeasures for protection against windstorms such as moderate gales and gusts and against turbulence, as well as in performing maintenance and inspection.

The present invention seeks to eliminate the technical difficulties encountered in the conventional windmill generator apparatus of the abovementioned type.

An object of the present invention, therefore, is to provide a windmill generator apparatus which allows the windmill to be fully protected from moderate gales, turbulence and from other strong winds, and which permits maintenance and inspection to be performed with ease.

Another object of the present invention is to provide a windmill generator apparatus that allows electricity to be generated efficiently regardless of wind direction.

SUMMARY OF THE INVENTION

According to the present invention, a windmill generator apparatus comprises a duct possessing structure having a first annular floor and a first annular roof that are disposed substantially horizontally, a prescribed number of vertical stationary guiding partitions being radially provided between the first floor and roof, and a first space in the shape of a hollow cylinder which is formed within the central portion of the duct possessing structure; a revolving body having a circular second floor and a circular second roof, the inner sides of the second floor and second roof being formed so as to be smoothly continuous with the inner sides of the first floor and first roof, the revolving body further including, two duct-forming guide pillar members disposed between the second floor and roof symmetrically at the outer circumference portions thereof taking as a plane of symmetry a plane that contains the diameters of the second floor and roof, each of the guide pillar members comprising a duct-blocking arcuate outer wall along the outer circumference of the second floor and roof and a duct-forming curved inner wall connecting both side edges of the arcuate outer wall, the revolving body being adapted for revolution within the first hollow space, formed by the duct possessing structure, on an vertical axis coaxial therewith; a windmill axis horizontally supported for rotation within a second hollow space surrounded by the second floor, second roof and a pair of guide pillar members and on an axis which is the central axis of the second hollow space; a generator rotatably connected to the rotary shaft of the windmill; and wind directional means for turning the revolving body to point the windmill in the windward direction.

DESCRIPTION OF THE PREFERRED EMBODIMENTS

Before turning to the description of the preferred embodiments, the principle of the windmill generator apparatus of this invention will be described.

When a cylindrical object is placed in a fluid that is flowing in a single direction, a positive pressure is generally developed over a range of approximately 30° on both the right and left sides of the center line of the cylinder at the front end thereof, namely the side that is facing into the fluid flow, and a negative pressure is developed at the side and back of the cylinder, the negative pressure at the side being greater than that at the back so that a back flow tends to develop along the outer periphery of the cylinder. In many cases a Karman vortex will be produced behind the back surface of the cylinder. Accordingly, if a windmill mechanism of the type having a horizontal rotational axis were to be disposed so as to turn freely in accordance with the wind direction within a hollow cylindrical space formed internally of a duct possessing structure having a multiplicty of vertical stationary guide partitions arranged radially between an annular floor and roof, and if a power conversion mechanism were coupled to the windmill and adapted to convert the rotational energy generated by the windmill into another form of power, wind of a positive pressure that has entered the duct possessing structure from the windward direction would reach the windmill mechanism after being converged by the stationary guiding partitions at the front or windward side to rotate the windmill that will be disposed at such position. The wind current of a negative pressure would flow rearward from the sides and back of the duct possessing structure. For laminar flow along an object having a cylindrically shaped outer surface, the boundary between the negative and positive pressure regions is located at an angle of about 30° on either side of the windward face, and the pressure gradient is steep in the vicinity of the boundary. However, when the arrangement is such that a fluid will pass through a cylindrical space internally accommodating the windmill mechanism surrounded by the circumferential array of the radially disposed stationary guiding partitions, as in the present invention, the angle at which the boundary is located is generally enlarged beyond 30°, although the angle is not constant owing to the effects of fluid resistance and viscosity, flow speed, the weight of the windmill and the like. Experiments have shown, however, that the angle can be enlarged to about 45°. Furthermore, natural winds include three-dimensional vortex flows superimposed on the laminar flow of the principal wind direction in a complex manner, so that the wind direction in certain locations may constantly fluctuate irregularly centering about the principal wind direction. The windmill mechanism will follow these changes in wind direction only after some delay. It is therefore difficult to determine the boundary between the positive and negative pressures. In the present invention, a pair of guide pillar members rotated together with the windmill mechanism are provided to avoid such disturbance of a pressure gradient that fluctuates with the time and place.

Each guide pillar member comprises an arcuate blocking outer wall, which is adjacent the inner circumferential surface of the duct possessing structure at the outer circumferential portion of the freely revolving windmill mechanism, for blocking the inflow and outflow of wind from the radially arranged stationary guiding partitions over an angle of from about 20° to 140° on either side of the horizontally directed axis of rotation of the windmill, and a duct-forming curved inner wall which is located on the inside of the windmill mechanism and which interconnects both side edges of the blocking outer wall. The force of the wind can be extracted effectively by providing rectifying vanes, windmill guiding vanes or the like between the two guide pillar members. The outer diameter of the duct possessing structure in the apparatus of this invention depends upon the environmental conditions at the site where installed, and is preferably not less than 1.5 times the inner diameter. The rectifying vanes or guiding vanes are not necessarily required, but they may be installed advantageously in each duct located in the annular duct possessing structure.

The windmill generator apparatus of this invention will now be illustrated in greater detail with reference to the accompanying drawings.

First Embodiment

Figure 1:
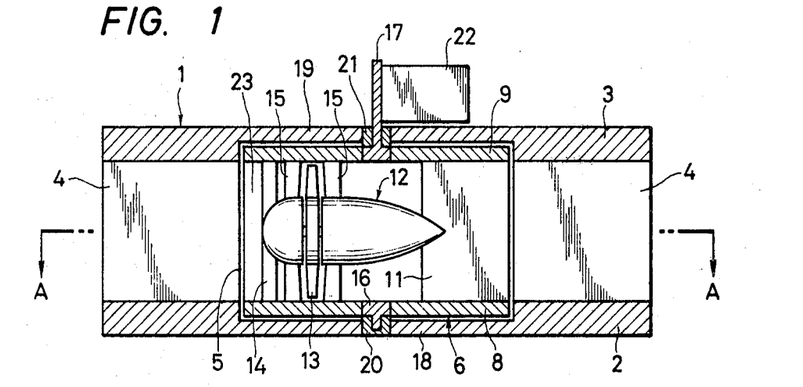
FIG. 1 is a vertical sectional view illustrating an embodiment of a windmill generator apparatus according to the present invention.
Figure 2:
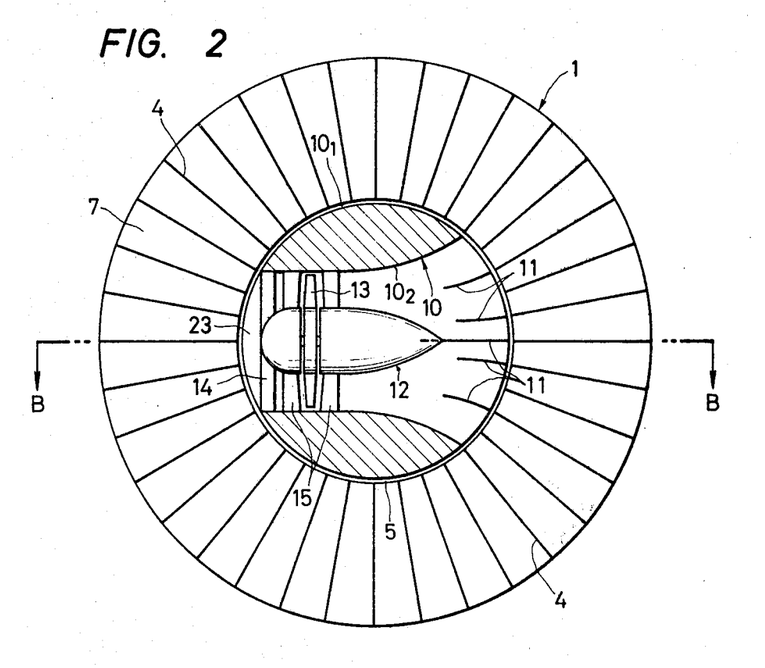
FIG. 2 is a sectional view taken along the line A—A of FIG. 1.

FIGS. 1 and 2 illustrate a first embodiment of the invention, in which FIG. 1 is a sectional view taken along the line B—B of FIG. 2, and FIG. 2 is a sectional view taken along the line A—A of FIG. 1.

A duct possessing structure 1 has a plurality of vertical stationary guiding partitions 4 arranged radially at a prescribed pitch such as 10° between a first floor 2 and first roof 3 which are annular in shape and horizontally disposed and spaced apart from each other by a prescribed distance. Defined within the inner circumferential portion of the duct possessing structure is a first hollow cylindrical space 5 that accommodates a revolving body 6 equipped with a windmill generator that will be described later.

The roof 3 may be formed to have an outer diameter larger than that of the floor 2 so that it will project in the manner of a canopy beyond the outer edges of the stationary partitions 4 to prevent rain or snow from penetrating the interior of the structure 1. In addition, to prevent heavy rain or snow from penetrating the ducts 7 formed between adjacent ones of the stationary guiding partitions 4, doors such as shutters may be provided in the entrance to each duct to close off all or a portion of the duct, or openable and closable doors mounted on hinges may be provided midway along the stationary guiding partitions 4. Such an arrangement also allows the ducts 7 to be shut off when the revolving body 6 is to be subjected to maintenance and inspection.

The revolving body 6 includes a second floor 8 and a second roof 9 which are circular in shape and of a diameter that is slightly less than the inner diameter of the first floor 2 and roof 3 of the duct possessing structure 1, i.e., slightly less than the outer diameter of the first hollow cylindrical space 5, the second floor 8 and roof 9 being so disposed as to be spaced apart by the same distance as that separating the first floor 2 and roof 3. Also included in the revolving body 6 and disposed between the second floor 8 and roof 9 are a pair of duct-forming guide pillar members 10 and guiding wall members 11 by which the structure of the revolving body 6 is connected and supported. Each of the duct-forming guide pillar members 10 comprises an arcuate outer wall $10_1$, along the outer circumference of the second floor 8 and roof 9, for blocking the ducts 7, and a duct-forming curved inner wall $10_2$ connecting both side edges of the arcuate outer wall $10_1$. The two duct-forming guide pillar members are disposed symmetrically at the outer circumferential portion of the second floor 8 and roof 9 taking as plane of a symmetry a plane that contains the diameters of the second floor 8 and roof 9. These have centrally located rotary shafts 16, and 17, respectively, that are rotatably supported by bearings 20, and 21 mounted in corresponding supporting discs or supporting arms 18, and 19 extending from the inner circumferential portions of the first floor 2 and roof 3, of the duct possessing structure 1, toward the center thereof. Thus the entire revolving body 6 is capable of turning freely within the hollow cylindrical space 5 in the inner circumferential portion of the duct possessing structure 1. It will be noted that a second hollow space 23 is formed by the surrounding second floor 8 and roof 9 and the two guide pillar members 10 of the revolving body 6. Supported within the second hollow space 23 by a rectifying vane 14 and guiding vanes 15 or the like is a windmill generator 12 having a windmill 13 that rotates about an axis which is the horizontal axis of the second hollow space 23.

The rotary shaft 17 provided on the second roof 9 of the revolving body 6 has an upward extension to which is attached a wind vane 22 arranged in the same direction as the axis of rotation of the windmill 13, whereby the revolving body 6 will be caused to turn so as to point the windmill 13 toward the windward direction at all times.

The guide pillar members 10 of the revolving body 6 preferably are provided to cover an angle ranging from about 20° to 140° on both sides of the horizontal axis of rotation of the windmill 13 on a horizontal plane containing said axis of rotation, thereby to block the ducts 7 which are formed by the stationary guiding partitions 4 of the duct possessing structure 1 within the above range of angles. The effect of blocking off the ducts 7 is similar to that which would be achieved by closing the same ducts at the outer ends thereof. This promotes the negative pressure on the leeward side of the duct possessing structure 1 to reduce the occurrence of vortex currents.

In order to heighten the efficiency of the windmill 13, the windmill 13 and guiding vanes 15 may be provided with variable pitch mechanisms in accordance with the ordinary fluidic machine concepts.

In the windmill generator apparatus described above, portions such as the duct possessing structure and revolving body can be constructed of material such as steel, reinforced concrete or steel members that are able to tolerate turbulence, strong gusts and gales, with members such as the windmill 13 being accommodated within the apparatus. As a result, members, such as the windmill, will not be subjected to the violent effects of a Coriolis force or the like that accompanies turbulence or sudden changes in wind direction, and power can be generated more efficiently by the force of the wind.

Second Embodiment

Figure 3:
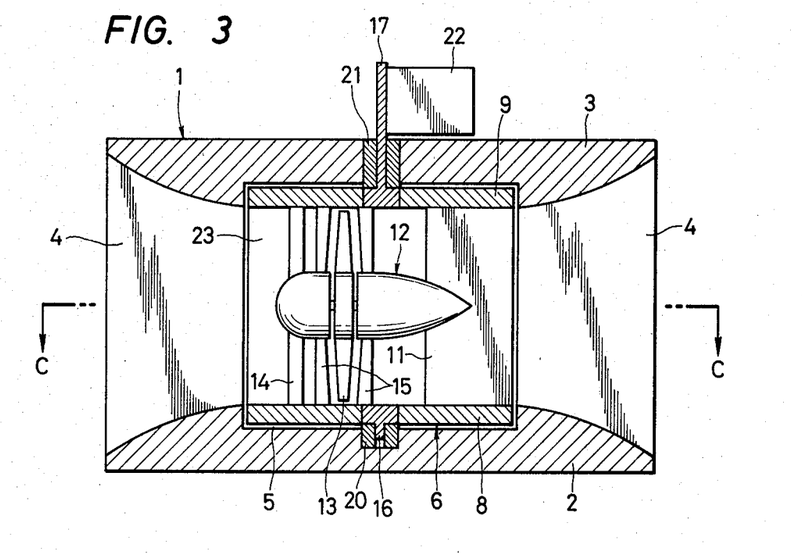
FIG. 3 is a vertical sectional view illustrating a second embodiment of the windmill generator apparatus of the present invention.
Figure 4:
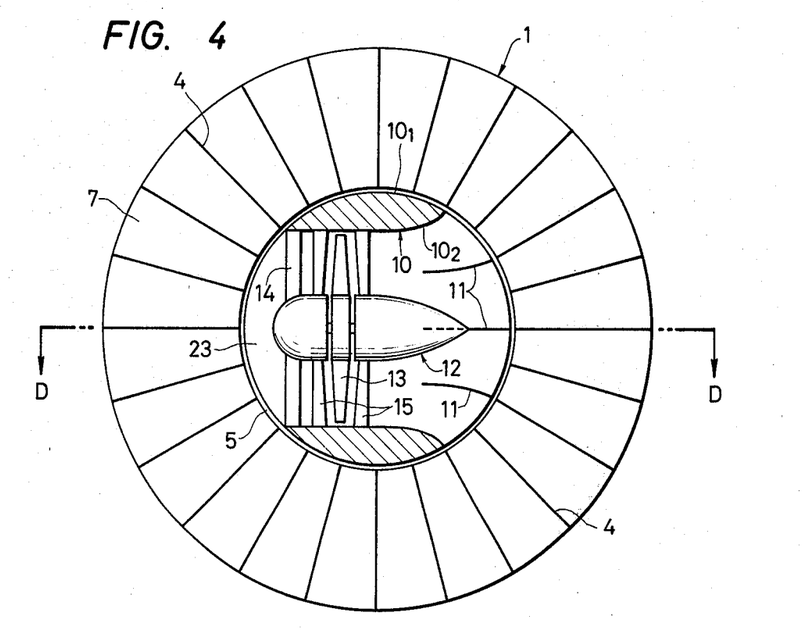
FIG. 4 is a sectional view taken along the line C—C of FIG. 3.

FIGS. 3 and 4 are sectional views that illustrate a modification of the first embodiment shown in FIGS. 1 and 2, wherein FIG. 3 is a sectional view taken along the line D—D of FIG. 4, and FIG. 4 is a sectional view taken along the line C—C of FIG. 3.

The arrangement shown in FIGS. 3 and 4 differs from that depicted in FIGS. 1 and 2 in that the distance between the annular first floor 2 and roof 3 of the duct possessing structure 1 is gradually enlarged from the inner circumference of the structure to the outer circumference thereof. The arrangement is identical with that of FIGS. 1 and 2 in all other aspects, but utilizes the wind power much more efficiently.

Third Embodiment

Figure 5:
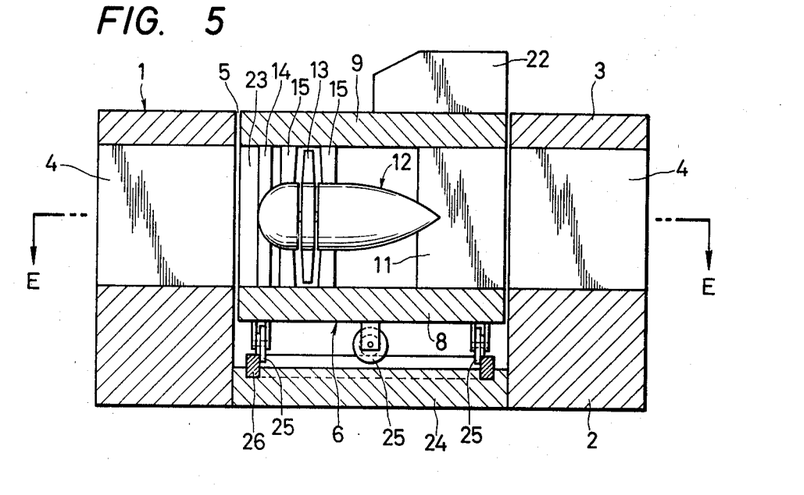
FIG. 5 is a vertical sectional view illustrating a third embodiment of the windmill generator apparatus of the present invention.
Figure 6:
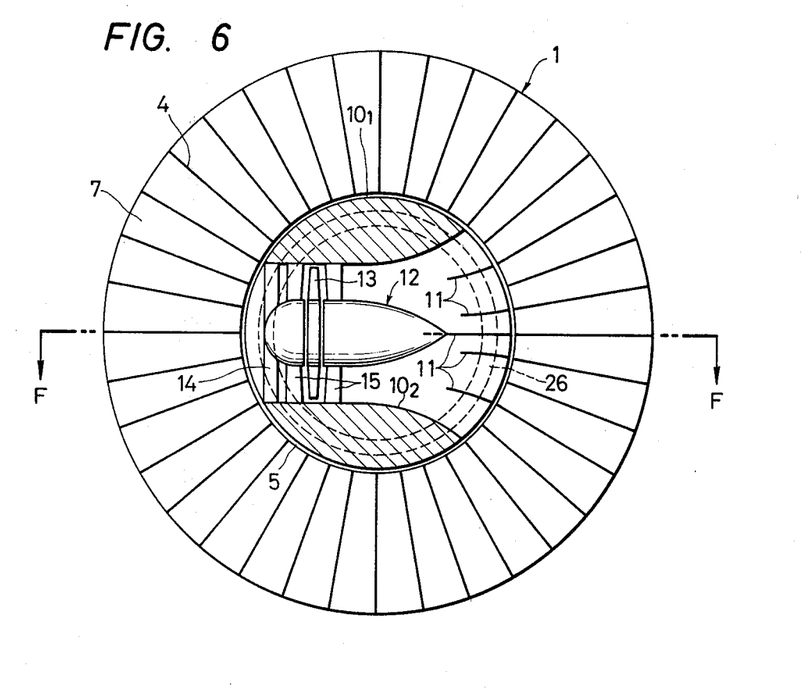
FIG. 6 is a sectional view taken along the line E—E of FIG. 5.

FIGS. 5 and 6 illustrate a third embodiment of the present invention, in which FIG. 5 is a sectional view taken along the line F—F of FIG. 6, and FIG. 6 is a sectional view taken along the line E—E of FIG. 5.

Numeral 1 denotes a duct possessing structure having a plurality of vertical stationary guiding partitions 4 arranged radially between a first floor 2 and first roof 3 which are annular in shape and horizontally disposed. Numeral 5 denotes a hollow cylindrical space formed within the duct possessing structure 1. Numeral 6 designates a revolving body connected and supported by two duct-forming guide pillar members 10 and a guiding wall member 11, each guide pillar member 10 comprising a duct-blocking arcuate outer wall $10_1$ and a duct-forming curved inner wall $10_2$, the two guide pillar members 10 and the guiding wall members 11 being disposed between a circular second floor 8 and circular second roof 9. The revolving body 6 is, furthermore, provided with a wheel 25 that is attached to the lower side of the floor 8 so as to travel along a circular rail 26 disposed on a circular base 24. The revolving body 6 has a windmill generator 12 mounted inside, and a wind directional vane 22 attached to the upper surface of its roof 9.

Fourth Embodiment

Figure 7:
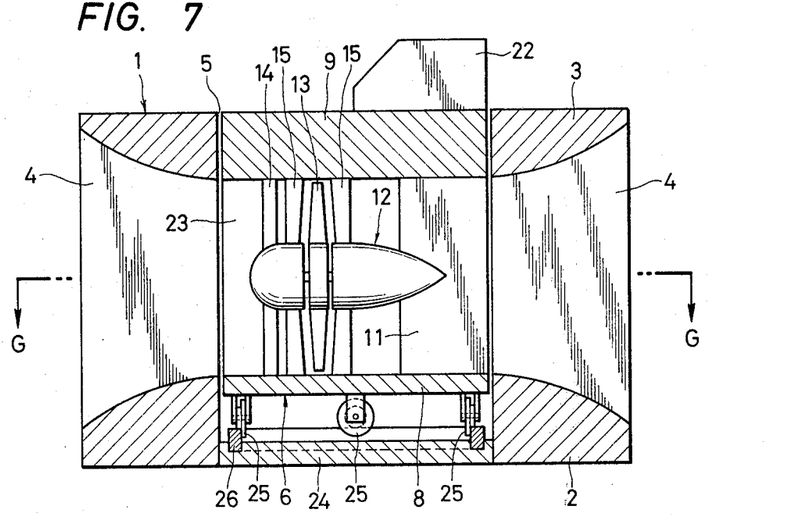
FIG. 7 is a vertical sectional view illustrating a fourth embodiment of the windmill generator apparatus of the present invention.

FIG. 7 illustrates a sectional view that is a modification of the third embodiment shown in FIGS. 5 and 6, wherein a section taken along the line G—G of FIG. 7 would present a view identical to that shown in FIG. 4.

The arrangement shown in FIG. 7 differs from that depicted in FIGS. 5 and 6 in that the distance between the annular first floor 2 and roof 3 of the duct possessing structure 1 is gradually enlarged from the inner circumference of the structure to the outer circumference thereof. The arrangement is identical with that of FIGS. 5 and 6 in all other aspects.

Fifth Embodiment

Figure 8:
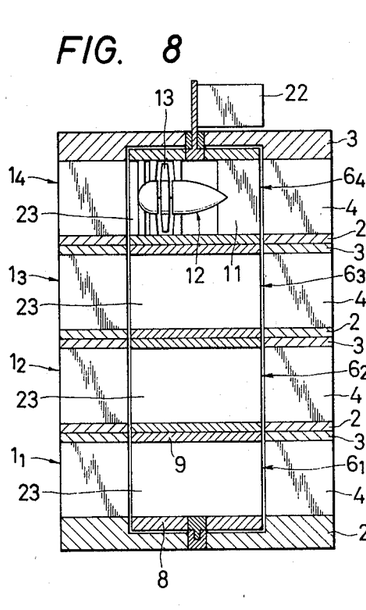
FIG. 8 is a vertical sectional view illustrating a fifth embodiment of a cascade arrangement of several windmill generator apparatus units according to the present invention.
Figure 10:
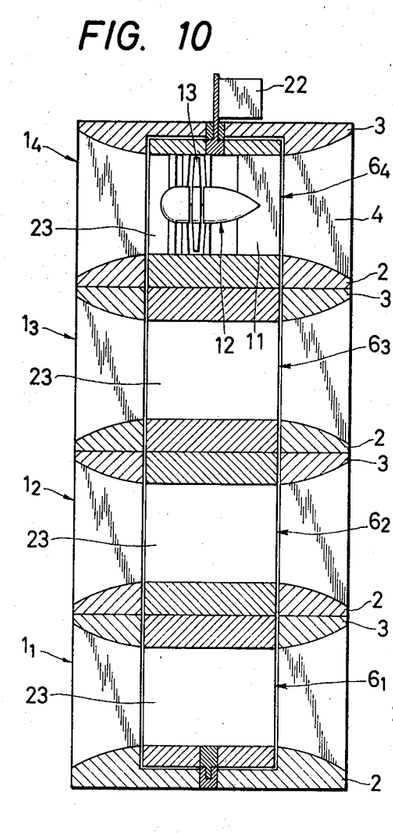
FIG. 10 is a vertical sectional view illustrating a modification of the arrangement shown in FIG. 8.

FIGS. 8 and 10 illustrate a cascade arrangement in which plural units of the windmill generator apparatus of the type shown in FIGS. 1 and 3, respectively, are stacked in order to increase the electrical output obtained from the wind power at a single installation. This will be described with reference to FIG. 8.

Duct possessing structures $1_1$, $1_2$, $1_3$, $1_4$ are stacked coaxially in the order mentioned. The lowermost revolving body $6_1$ still has a second floor 8 equipped with a bearing portion, but the roof 9 is merely a circular plate from which the supporting disc 19, bearing 21, rotary shaft 17 and wind directional vane 22 have been deleted. The uppermost revolving body $6_4$ still has a second roof 9 equipped with a supporting disc 19, rotary shaft 17, bearing 21 and wind directional vane 22, but the second floor 8 is merely a circular plate from which the supporting disc 18, bearing 20 and rotary shaft 16 have been deleted. The second floor 8 and second roof 9 of each of the intermediate revolving bodies $6_2$, and $6_3$ are merely circular plates. The revolving bodies $6_1$, $6_2$, $6_3$, and $6_4$ are stacked in the order mentioned and constitute a unitary structure, so that the revolving bodies revolve in unison within a hollow cylindrical space defines within the stacked duct possessing structures $1_1$, $1_2$, $1_3$, $1_4$.

The arrangement shown in FIG. 10 may be obtained by stacking the apparatus of FIG. 3 in the manner described above. It should be obvious that almost the same method can be employed to stack the apparatus shown in FIG. 5.

Sixth Embodiment

Figure 9:
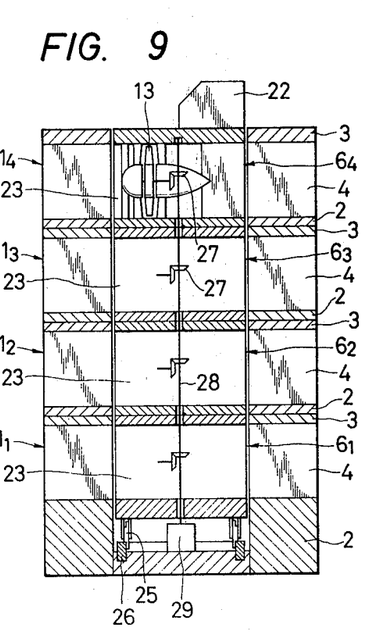
FIG. 9 is a vertical sectional view illustrating a sixth embodiment of a cascade arrangement of several windmill generator apparatus units according to the present invention.
Figure 11:
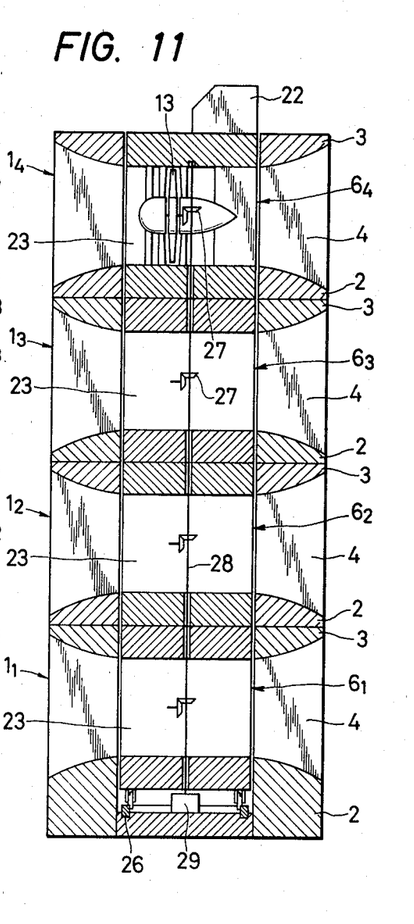
FIG. 11 is a vertical sectional view illustrating a modification of the arrangement shown in FIG. 9.

FIGS. 9 and 11 illustrate another embodiment of a cascade arrangement of the windmill generator apparatus according to the present invention. In the arrangement of this embodiment, the windmill generator does not have a direct connection between the windmill and the generator section, as in the foregoing embodiments. Instead, the arrangement is such that the rotational motion of the windmill 13 is transmitted to a generator unit 29 through a gear mechanism 27 and a common vertical rotary shaft 28.

It should be noted that the role of pointing the horizontal axis of rotation of the windmill in the windward direction need not necessarily be performed by the wind directional vane described above. The same role can be performed by a separately provided wind direction sensor adapted to generate signals for the purpose of directional control.

The characterizing features of the invention and certain modifications that can be made when putting the apparatus into practical use will now be described.

1. The duct possessing structure, since it is constructed of steel reinforced concrete or of steel plates, fully protects the interior of the revolving body, which includes the windmill and which is accommodated within the duct possessing structure, from the effects of gales, wind gusts and turbulence. The duct possessing structure supplies the windmill with effective positive and negative pressures and both rectifies and converges the wind to enhance effectiveness.

2. The revolving body rotates gently while adapting to wind direction to convert the wind power into another form of power in an extremely efficient manner.

3. The rotary blades of the windmill are subjected to centrifugal forces as they rotate, and they move in a complex manner on the basis of cetain hydromechanical essentials. Hence, since there is a limit upon the strength of materials, there is also a limit upon the extent to which the blades can be enlarged. The apparatus of the present invention offers a solution by the arrangements shown in FIGS. 8 through 11, where a number of the windmill generator units are stacked and the outputs of the individual windmills are combined to allow a reduction in the amount of space required for installation and to permit the utilization of winds high above the earth's surface. The end result is an improvement in overall economy.

4. The duct possessing structure, in addition to having the vertical stationary guiding partitions, may be provided with horizontal vanes installed in the ducts between adjacent ones of the guiding partitions, with mesh screens mounted in the ducts for keeping out foreign matter, or with reinforcing members inserted within the ducts.

5. If the duct possessing structure and the like are divided into a number of units and the units are conveyed to the site and assembled to erect the apparatus, conveyance to the site and installation at sites of limited area can be facilitated. The possibility of mass production may also be expected.

6. If the apparatus is installed at a site where there is a principal wind direction or where an obstacle blocking the wind is located nearby, the duct possessing structure can be so modified as to conform to the principal wind direction in an effective manner. It is also possible to gradually flare the floor and roof of the duct possessing body in the direction of their perimeters to smoothen the flow of wind into the ducts.

7. Every one of the ducts formed between the adjacent stationary guiding partitions of the duct possessing structure may be provided with a door for closing off all or a portion of the duct. This would prevent heavy rain, snow and strong winds from penetrating the interior, and would assure the safety of personnel who have entered the apparatus for inspection or maintenance.

8. In general, windmills have a tendency to produce noise. This is difficult to prevent, and the noise is difficult to shield. One advantage of the present apparatus, however, is that the noise can be greatly suppressed by suitably selecting the surface materials and shape of such members as the floors, roofs, stationary guiding partitions, rectifying vanes and guiding vanes.

As many apparently widely different embodiments of this invention may be made without departing from the spirit and scope thereof, it is to be understood that the invention is not limited to the specific embodiments thereof except as defined in the appended claims.

What we claim is:

1. A windmill generator apparatus comprising:
a duct possessing structure including:
a first annular floor and a first annular roof of prescribed inner and outer diameters, substantially horizontally disposed and spaced apart from each other by a prescribed distance, and a prescribed number of vertical stationary guiding partitions radially provided between said first floor and said first roof; a first space in the shape of a hollow cylinder being formed within the central portion of said duct possessing structure;
a revolving body including:
a circular second floor and a circular second roof of outer diameters smaller than the outer diameter of the first space, the inner sides of said second floor and of said second roof defining a smooth continuous surface with the inner sides of said first floor and said first roof, and two duct-forming guide pillar members disposed between said second floor and said second roof symmetrically at the outer circumferential portions thereof taking as a plane of symmetry a plane that contains the diameters of said second floor and said second roof, each of said guide pillar members comprising a duct-blocking arcuate outer wall along the outer circumference of said second floor and said second roof, and a duct-forming curved inner wall connecting both side edges of said arcuate outer wall; said revolving body being adapted for rotation within said first space on an axis coaxial therewith;
a windmill supported for rotation within a second hollow space, defined by said second floor, said second roof and by said two guide pillar members of said revolving body, and on an axis which is the vertical central axis of said second hollow space;
a rotational generator rotated by said windmill; and
wind directional means for turning said revolving body so as to point said windmill in the windward direction.

2. A windmill generator apparatus according to claim 1, in which said first floor and first roof of said duct possessing structure lie in parallel with each other.

3. A windmill generator apparatus according to claim 1, in which the distance between said first floor and first roof of said duct possessing structure is gradually increased from the inner to the outer circumference thereof.

4. A windmill generator apparatus comprising:
a plurality of windmill units, each windmill unit comprising:
a duct possessing structure including a first annular floor and a first annular roof of prescribed inner and outer diameters, substantially horizontally disposed and spaced apart from each other by a prescribed distance, and a prescribed number of vertical stationary guiding partitions radially provided between said first floor and said first roof, a first space in the shape of a hollow cylinder being formed within the central portion of said duct possessing structure;
a revolving body including a circular second floor and a circular second roof of outer diameters smaller than the outer diameter of the first space, the inner sides of said floor and of said second roof defining a smooth continuous surface with the inner sides of said first floor and of said first roof, and two duct-forming guide pillar members disposed between said second floor and said second roof symmetrically at the outer circumferential portions thereof taking as a plane of symmetry a plane that contains the diameters of said second floor and said second roof, each of said guide pillar members comprising a duct-blocking arcuate outer wall along the outer circumference of said second floor and said second roof, and a duct-forming curved inner wall connecting both side edges of said arcuate outer wall, said revolving body being adapted for rotation within said first space on an axis coaxial therewith; and a windmill supported for rotation within a second hollow space, defined by said second floor, said second roof and by said two guide pillar bers of said revolving body, and on an axis which is the central axis of said second hollow space;

said plurality of windmill units being stacked coaxially and so arranged as to align the axis of rotation of each said windmill in the same direction;

said duct possessing structures being integrated to form a unitary structure;

said revolving bodies being integrated to form a unitary structure;

a rotational generator rotated by said windmills; and wind directional means for turning the unitary structure of said revolving bodies so as to point said unitary structure in the windward direction.

5. A windmill generator apparatus according to claim 4, in which said first floor and first roof of said duct possessing structure lie in parallel with each other.

6. A windmill generator apparatus according to claim 4, in which the distance between said first floor and first roof of said duct possessing structure is gradually increased from the inner to the outer circumference thereof.

* * * * *